(12) United States Patent
Chai et al.

(10) Patent No.: US 8,149,545 B1
(45) Date of Patent: Apr. 3, 2012

(54) LOW PROFILE LOAD BEAM WITH ETCHED CAVITY FOR PZT MICROACTUATOR

(75) Inventors: Wei Keat Chai, Temecula, CA (US); Peter Hahn, Wildomar, CA (US)

(73) Assignee: Magnecomp Corporation, Murrieta, CA (US)

( * ) Notice: Subject to any disclaimer, the term of this patent is extended or adjusted under 35 U.S.C. 154(b) by 401 days.

(21) Appl. No.: 12/582,548

(22) Filed: Oct. 20, 2009

Related U.S. Application Data (60) Provisional application No. 61/107,926, filed on Oct. 23, 2008.

(51) Int. Cl.
*G11B 5/56* (2006.01)
(52) U.S. Cl. .................................................. 360/294.3
(58) Field of Classification Search ................ 360/294.3
See application file for complete search history.

(56) References Cited

U.S. PATENT DOCUMENTS

| | | | |
|---|---|---|---|
| 5,189,578 A | 2/1993 | Mori et al. | |
| 5,867,347 A | 2/1999 | Knight et al. | |
| 5,898,544 A | 4/1999 | Krinke et al. | |
| 6,046,888 A | 4/2000 | Krinke et al. | |
| 6,157,522 A | 12/2000 | Murphy et al. | |
| 6,215,629 B1 * | 4/2001 | Kant et al. | 360/290 |
| 6,219,203 B1 | 4/2001 | Arya et al. | |
| 6,268,983 B1 | 7/2001 | Imada et al. | |
| 6,278,587 B1 | 8/2001 | Mei | |
| 6,297,936 B1 | 10/2001 | Kant et al. | |
| 6,327,120 B1 | 12/2001 | Koganezawa et al. | |
| 6,331,923 B1 | 12/2001 | Mei | |
| 6,522,050 B2 | 2/2003 | Sivadasan et al. | |
| 6,597,541 B2 | 7/2003 | Nishida et al. | |
| 6,614,627 B1 | 9/2003 | Shimizu et al. | |
| 6,661,619 B2 | 12/2003 | Nishida et al. | |
| 6,680,825 B1 * | 1/2004 | Murphy et al. | 360/294.4 |
| 6,731,472 B2 | 5/2004 | Okamoto et al. | |
| 6,760,194 B2 | 7/2004 | Shiraishi et al. | |
| 6,856,075 B1 | 2/2005 | Houk et al. | |
| 6,870,710 B2 | 3/2005 | Hida et al. | |
| 6,879,468 B2 * | 4/2005 | Nakamura et al. | 360/294.1 |
| 6,917,498 B2 | 7/2005 | Kuwajima et al. | |
| 6,927,947 B2 | 8/2005 | Shimizu et al. | |
| 7,016,159 B1 | 3/2006 | Bjorstrom et al. | |
| 7,023,667 B2 | 4/2006 | Shum | |
| 7,046,485 B2 | 5/2006 | Kuwajima et al. | |
| 7,072,149 B2 | 7/2006 | Kuwajima et al. | |
| 7,110,224 B2 * | 9/2006 | Nakamura et al. | 360/294.1 |
| 7,292,413 B1 | 11/2007 | Coon | |
| 7,349,183 B2 | 3/2008 | Oh et al. | |

(Continued)

OTHER PUBLICATIONS

File History of Patent No. 7,595,965—Claims as Filed in U.S. Appl. No. 11/282,305. Office Actions, Response to Office Actions, and Notice of Allowance.

(Continued)

*Primary Examiner* — Mark Blouin
(74) *Attorney, Agent, or Firm* — Intellectual Property Law Offices of Joel Voelzke, APC (57) ABSTRACT

A dual-stage actuator disk drive suspension load beam has a recessed cavity formed in it into which the microactuator motor is partially or completely placed. The cavity may be formed by partially etching the load beam during the same etching process that creates the load beam from a sheet of stainless steel material. The partially etched load beam having a cavity for the microactuator motor has the advantages of a lower profile, improved inertial balancing of the suspension, and increased sway resonant frequency.

20 Claims, 4 Drawing Sheets

U.S. PATENT DOCUMENTS

| | | | |
|---|---|---|---|
| 7,365,944 B2 | 4/2008 | Fujimoto et al. | |
| 7,375,930 B2 | 5/2008 | Yang et al. | |
| 7,408,745 B2 | 8/2008 | Yao et al. | |
| 7,417,830 B1 * | 8/2008 | Kulangara | 360/294.4 |
| 7,440,236 B1 | 10/2008 | Bennin et al. | |
| 7,459,835 B1 | 12/2008 | Mei et al. | |
| 7,595,965 B1 | 9/2009 | Kulangara et al. | |
| 7,821,742 B1 * | 10/2010 | Mei | 360/294.3 |
| 7,872,834 B1 | 1/2011 | Pokornowski et al. | |
| 2002/0008436 A1 | 1/2002 | Sivadasan et al. | |
| 2002/0048124 A1 | 4/2002 | Kuwajima et al. | |
| 2007/0291418 A1 | 12/2007 | Kwon et al. | |

OTHER PUBLICATIONS

U.S. Appl. No. 11/282,305, Single PZT Actuator for Effecting Rotation of Head Suspension Loads, Issued as Patent No. 7,595,965.

U.S. Appl. No. 12/533,459, Suspension Assembly Having Recessed Actuator with Simplified Lead Connection, Cont. of U.S. Appl. No. 11/282,305, Issued as Patent No. 7,751,153.

U.S. Appl. No. 12/582,548, Load Beam with Etched Cavity for PZT Microactuator, Awaiting First Office Action.

* cited by examiner

LOW PROFILE LOAD BEAM WITH ETCHED CAVITY FOR PZT MICROACTUATOR

CROSS-REFERENCE TO RELATED APPLICATIONS

This application claims priority from U.S. Provisional Application No. 61/107,926 filed Oct. 23, 2008.

BACKGROUND OF THE INVENTION

1. Field of the Invention

This invention relates to the field of disk drive suspensions. More particularly, this invention relates to the field of a low profile suspension having a cavity formed therein for receiving a microactuator.

2. Description of Related Art

The suspension is the component of a magnetic hard disk drive, or other type of disk drive such as an optical disk drive, that holds the read/write head over the surface of the spinning disk. A servo-controlled voice coil motor (VCM) moves the suspension and thus positions the read/write head precisely over the desired data track on the disk.

Due to the increasing data densities in modern disk drives, in addition to the VCM for coarse positioning of the read/write head, many suspensions now also incorporate a microactuator on the suspension itself for extremely fine and fast positioning of the read/write head. Suspensions that incorporate a microactuator are sometimes referred to as dual-stage actuator (DSA) suspensions. Piezoelectric devices, typically lead zirconate titanate (PZT) devices, are commonly used as the microactuator motors in DSA suspensions.

U.S. Pat. No. 6,614,627 issued to Shimizu et al. discloses a DSA suspension having two PZT motors for micropositioning of the read/write head, and folded springs protruding from either side of the suspension, commonly called "C-springs," for flexibility.

U.S. Pat. No. 6,856,075 issued to Houk et al. discloses an adhesive control feature consisting of a relief defining a channel under or partially under or adjacent to a PZT transducer to channel and control the flow of adhesive and prevent the adhesive from flowing or wicking underneath the PZT toward the center of the PZT which would reduce its effective stroke length.

U.S. Pat. No. 6,219,203 issued to Arya et al. discloses a suspension which purports to eliminate the separate forming step of bending the lateral edges of the load beam to create edge rails for stiffness, by partially etching the load beam on both sides to create truss-like rib structures in the load beam, the rib structures providing mechanical stiffness.

U.S. Pat. No. 7,375,930 issued to Yang et al. discloses a suspension having a microactuation device integrated on the gimbal.

U.S. Pat. No. 7,459,835 issued to Mei et al. discloses a suspension having a cantilevered bending motor disposed on the load beam.

One of the design goals of a disk drive suspension is a low profile. A low profile suspension allows the individual disks within a multiple disk hard drive, each disk having its own suspension to read and write data to it, to be stacked closely together thus decreasing the height of the multiple disk assembly.

Another design goal is a high resonant frequency of the suspension in both the vertical dimension and the horizontal (sway) dimension. Similarly, it is desired that the suspension exhibit a low gain at the frequencies at which the suspension will be excited due to vibration of the disk, movement of the suspensions by the VCM, and micro movement of the suspension by the PZT.

SUMMARY OF THE INVENTION

The present invention is of a suspension that has a cavity or recess formed in its load beam into which the microactuator motor is partially or completely placed. The cavity is preferably formed by partially etching the load beam during the same etching process that creates the load beam from a sheet of stainless steel material, although other methods of forming the cavity such as by laser ablation are possible.

The partially etched load beam having a cavity for the PZT has several advantages. First, by placing the PZT into a cavity, the suspension profile is made to have a lower profile, which produces the dual advantages of less windage, i.e., wind induced vibration, and closer stacking of disks within a multiple disk stack. Second, partially or completely recessing the PZT into a cavity in the load beam improves the inertial balancing of the suspension and increases the sway (side to side) resonant frequency of the suspension, thus decreasing the gain of the sway at the frequencies of greatest interest. Third, the invention allows the sway dynamic performance of a suspension to be easily adjusted by altering any one of several different design parameters that are determined at the load beam etching step. Fourth, prior art microactuated suspensions in which the PZTs were located on or within the base plate suffered the disadvantage that actuation of the PZTs induced vibration in the base plate which in turn caused vibration within the E-block within a suspension stack and thus coupled unwanted vibration to other suspensions within the stack; in contrast, because the microactuator motor is located distal of the suspension hinges in the present invention there is significantly less vibration coupling from the PZT of one suspension to other suspensions within the same stack of disks. The invention is particularly well suited to high sway and moderate stroke type DSA suspensions to meet current design requirements.

Exemplary embodiments of the invention will be further described below with reference to the drawings, in which like numbers refer to like parts.

DETAILED DESCRIPTION OF THE PREFERRED EMBODIMENTS

DSA suspensions can employ either a single PZT which acts in one direction and also in the opposite direction in push-pull fashion, sometimes called a split PZT, or can employ two physically separate PZTs each operating in only a single direction or in two opposing directions. U.S. Pat. No. 6,614,627 issued to Shimizu et al. is an example of a micro-actuated suspension of the former type, and U.S. Pat. No. 7,459,835 issued to Mei et al. is an example of a microactuated suspension of the latter type. Split PZTs are discussed more fully in commonly owned U.S. patent application Ser. No. 11/507,227 which is hereby incorporated by reference as if fully set forth herein.

For convenience of discussion, the present invention will be discussed with reference to either a single PZT or two PZTs, it being understood that the number of PZTs, and whether they are used in unidirectional or bidirectional manner, is not critical to the invention which can be employed regardless of the number of PZTs used in a particular design or the manner of operating those PZTs. It will also be understood that the present invention can be used with microactuator motors other that piezoelectric devices, including without limitation electrostatic devices.

Figure 1:
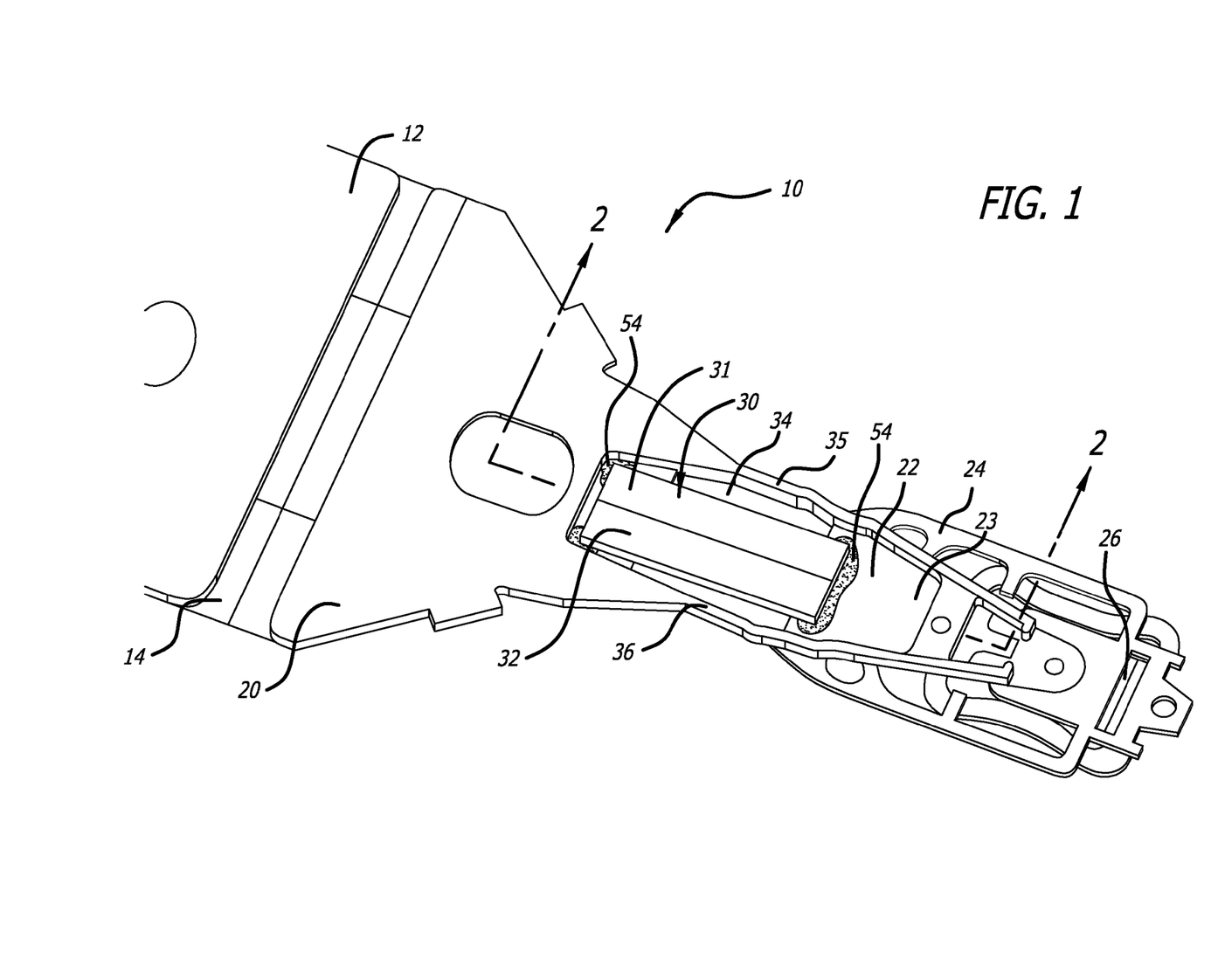
FIG. 1 is an oblique view of a first embodiment illustrating a partially etched load beam having a cavity for the PZT, according to a first aspect of the invention.

FIG. 1 shows a first embodiment according to a first major aspect of this invention. The electrical leads and electrical interconnect have been omitted for clarity of illustration. Suspension 10 includes a base portion such as a base plate 12 at a proximal end of the suspension, hinges or springs 14, load beam 20, and flexure 24 including a head gimbal on which slider 26, which contains the read/write head, is mounted. Slider 26 is mounted at or near a distal end of load beam 20. According to this embodiment, a recess or recessed cavity 22 is etched into load beam 20 via partial etching of the load beam, by laser ablation, or by other suitable forming method, and is located distal of load beam spring hinges 14. In the exemplary embodiment, a split PZT 30, which has a left side PZT element 31 and a right side PZT element 32, is fitted into cavity 22 to span aperture 34 in cavity floor 23, and is electrically connected to the microactuator driving voltage. Thus, the foot print of cavity 22 is at least as large as the footprint of PZT 30. In a split PZT such as PZT 30, when the same voltage is applied to one surface such as the top surface of first PZT element 31 and the top surface of second PZT element 32, one PZT element expands while the other contracts. A split PZT therefore enjoys the advantage that only a single driving voltage and electrical connection, and a single ground, are needed for push-pull operation. Alternatively, first and second PZT elements 31 and 32 could be replaced with separate PZT devices, with separate driving voltages of +V being applied to the first PZT device and a negative voltage −V being applied simultaneously to the second PZT device in order to effect fine positioning of the head, and with associated separate driving voltage electrical connections.

Returning to the exemplary embodiment employing a split PZT 30, PZT 30 could be connected to the driving voltage using standard PZT electrical connection techniques which are well known to those of ordinary skill in the art of DSA suspensions, or could be connected via TAB bonding or other bonding technique as will be described later. PZT 30 extends from a proximal side of load beam cavity 22 to a distal side thereof, across an aperture 34 formed in load beam 20 such as by etching during the same etching process as created cavity 22 and various other features of load beam 20. PZT 30 has its proximal and distal sides affixed to load beam 10 on both the proximal and distal sides respectively of aperture 34 via conductive epoxy 54, or other conductive adhesive, or by other possible means. Electrical leads may be connected and routed in a generally conventional manner to provide an electrical connection to actuate PZT 30. In the illustration, the bottom surface of PZT 30 constitutes the ground surface or ground electrode of PZT 30, and adhesive 54 is conductive epoxy, such that the ground electrode of PZT 30 is directly grounded to load beam 20 without any wires therebetween. Load beam 20 can be formed integral with base plate 12 and springs 14 from a single sheet of stainless steel such as by etching, or can be formed separately and thereafter welded to the other components, as is conventionally known.

PZT microactuator 30 is at least partially disposed and received within cavity 22, and is supported at its proximal and distal ends by floor 23 of cavity 22. Preferably, cavity 22 is at least as deep as PZT elements 31 and 32 are high, so as to substantially completely receive PZT 30 therein such that the top of PZT 30 is no higher than the plane defined by the top surface of load beam 20. In one embodiment as shown in FIG. 1, the depth of cavity 22 is approximately equal to the height of PZT 30 plus the height of adhesive 54, such that the tops of PZT elements 31 and 32 are generally flush with the plane of the top surface of the load beam, and PZT elements 31 and 32 are completely received and contained within cavity 22. In another embodiment, the depth of cavity 22 is equal to or greater than half the height of PZT elements 31 and 32 such that the majority of PZT 30 is received and contained within cavity 22. In an exemplary embodiment, load beam 20 has a height of approximately 100 microns, PZT elements 31 and 32 have a depth of approximately 80 microns, and the PZT elements are completely received within cavity 22. Although it is currently contemplated as being preferred that PZT 30 be completely received within cavity 22, it is not strictly necessary that PZT 30 be completely received within cavity 22, and PZT 30 could partially protrude from the top of cavity 22 past the top surface of load beam 20 while still obtaining some of the benefits of the present invention including reduced windage and improved sway performance.

Load beam 20 features flexible outriggers or side rails 35 and 36 that bend when PZT 30 is actuated. Side rails 35 and 36 therefore act as microactuation hinges that flex to allow the distal end of suspension 20 containing slider 26 to move horizontally when an actuation voltage is applied to the top surface of PZT 30 thus actuating the microactuator. Side rails 35 and 36 preferably have high lateral stiffness to attain high sway frequency, yet are flexible enough to allow the distal end of the load beam, at which slider 26 is mounted, to be rotated to the right or to the left by operation of PZT 30. To meet these design goals, side rails 35 and 36 are preferably about 0.15 mm thick and 0.070 mm wide in an exemplary embodiment, and made of stainless steel. Side rails 35 and 36 may be slightly bowed and/or bent outward as shown for example in FIG. 1 to provide flexibility for the microactuator operation.

Because PZT 30 is a split PZT, when a positive voltage is applied to the top surface of PZT 30 slider 26 moves in a first horizontal direction; when a negative voltage is applied to the top surface of PZT 30 slider 26 moves in a second horizontal direction opposite to the first horizontal direction.

Figure 2:
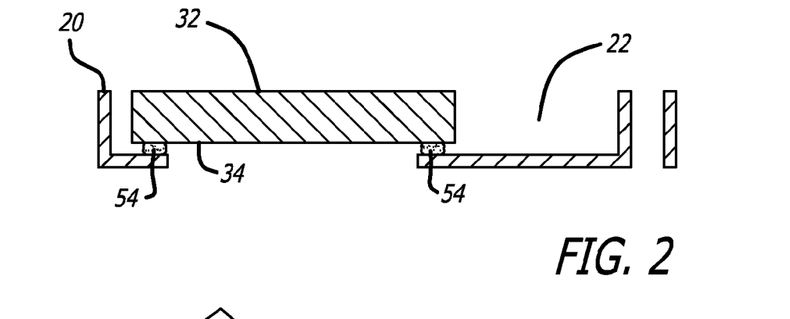
FIG. 2 is a side cut-away view of the suspension of FIG. 1 taken along section line 2-2.

FIG. 2 is a side cut-away view of the suspension of FIG. 1 taken along section line 2-2. For simplicity and clarity of illustration, only the material which is actually transversed by section line 2-2 is shown; the features in the background behind the section line are not shown. Section line 2-2 is slightly off center from the longitudinal axis of suspension 20 so as to run through right hand PZT element 32. Cavity 22 partially is etched into load beam 20, and aperture 34 is etched all the way through load beam 20. Aperture 34 is spanned by PZT element 32, which is mechanically and electrically bonded to load beam 20 by conductive epoxy 54.

In a preferred manufacturing method, load beam 20 and its various features are formed by etching from a single sheet of spring metal such as stainless steel. Thus, in a preferred embodiment, load beam 20, cavity floor 23, and side rails 35 and 36, constitute a unitary piece of stainless steel.

Figure 3:
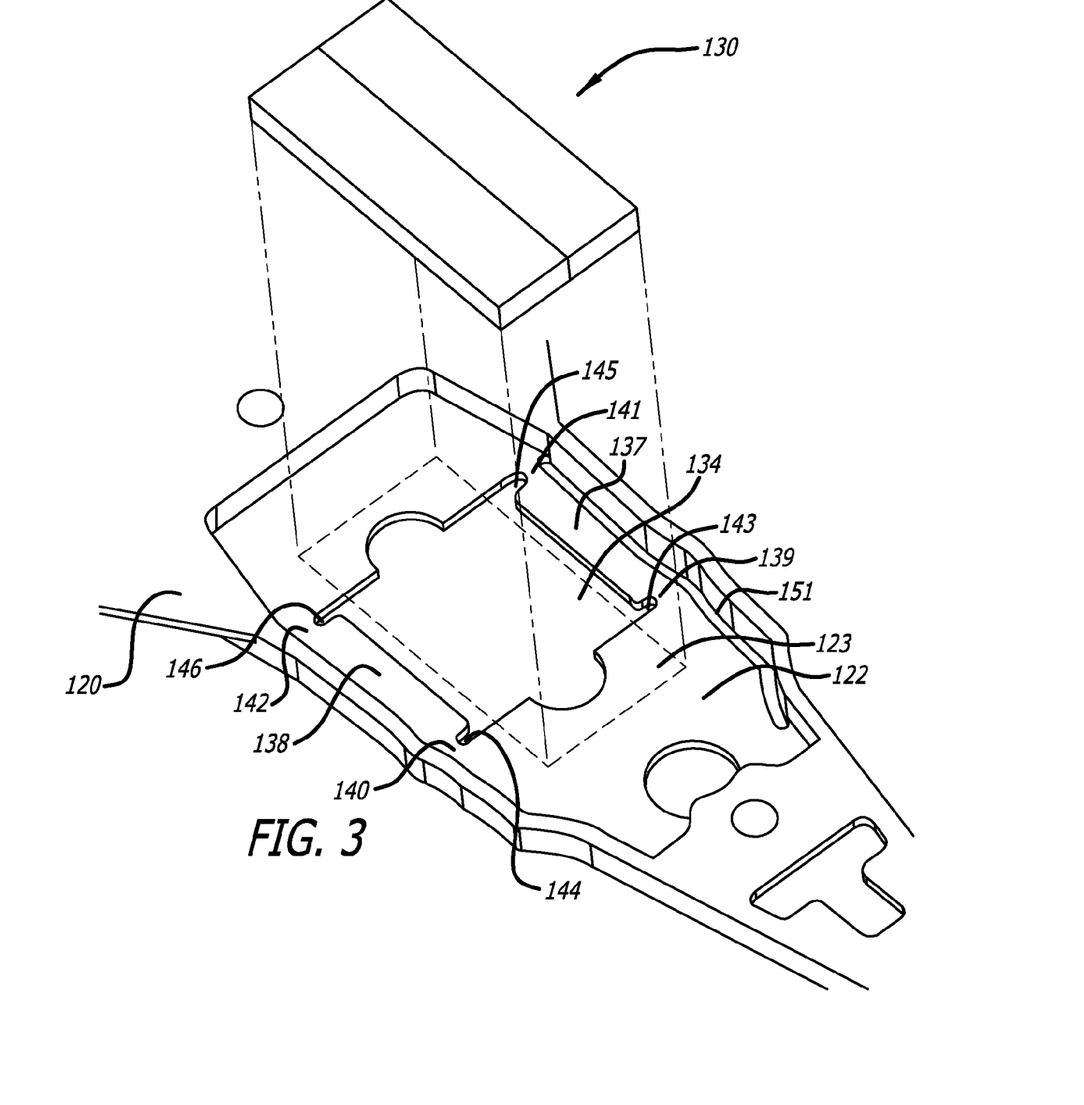
FIG. 3 is an oblique exploded view of the dimple side of a load beam having a cavity into which a PZT is mounted according to a second embodiment of the invention.
Figure 4:
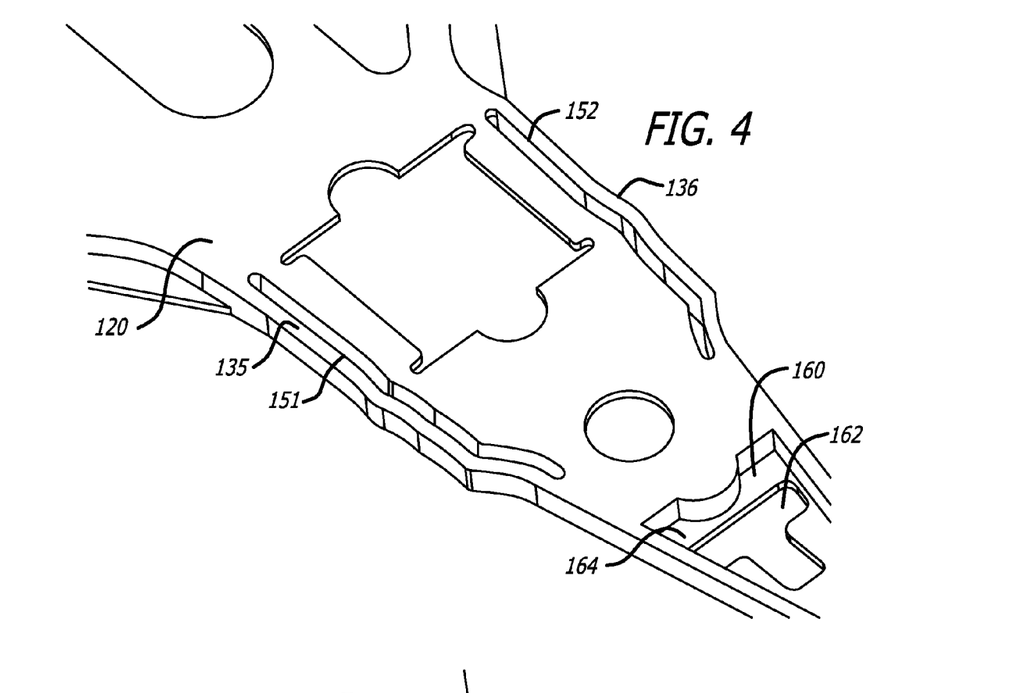
FIG. 4 is an oblique view of the slider side of the load beam of FIG. 3.

FIG. 3 is an oblique exploded view of the dimple side opposite the slider side of a load beam having a cavity into which a PZT is mounted according to a second embodiment of the invention, and FIG. 4 is oblique view of the slider side of the load beam of FIG. 3. Load beam 120 has cavity 122 formed therein, including cavity floor 123 and aperture 134. Microactuator motor 130 is positioned within aperture 134 to extend across aperture 134. In this embodiment trenches 151 and 152 are formed adjacent to side rails 135 and 136, respectively, and extend generally longitudinally at least partially laterally adjacent to microactuator 130 and aperture 134. Trenches 151 and 152, which constitute elongated apertures extending generally longitudinally through cavity floor 123, render load beam 120 more flexible in the area of side rails 135 and 136. In the embodiment shown trenches 151 and 152 extend generally longitudinally adjacent to and along the side rails 135 and 136, and separate side rails 135 and 136 from cavity floor 123. It is expected that for most applications trenches 151 and 152 would generally be at least 50% as long as microactuator motor 130. In the embodiment, trenches 151 and 152 are longer than is microactuator motor 130, and extend about twice the longitudinal distance as does aperture 134, and extend past a distal most extent of microactuator motor 130.

In the embodiment, aperture 134 has extended portions 143, 144, 145, and 146 that extend laterally toward trenches 151 and 152, but do not connect with trenches 151 and 152. The metal that separates aperture extensions 143 and 144 from trenches 151 and 152 define distal connection points 139 and 140, respectively. Similarly, the metal that separates aperture extensions 145 and 146 from trenches 151 and 152 define proximal connection points 141 and 142, respectively. The metal disposed between left side distal connection point 139 and proximal connection point 141 defines a left side sway stiffener 137 that is bounded on its inside by aperture 134, is bounded on its outside by trench 151, and is connected to the remainder of cavity floor 123 by connection points 139 and 141. Similarly, the metal disposed between right side distal connection point 140 and proximal connection point 142 defines a right side sway stiffener 138 that is bounded on its inside by aperture 134, is bounded on its outside by trench 152, and is connected to the remainder of cavity floor 123 by connection points 140 and 142. Sway stiffeners 137 and 138 extend generally parallel to side rails 135 and 136, and are connected to the remainder of cavity floor 123 by connection points 139 and 141, and 140 and 142, respectively, that are narrower than sway stiffeners 137 and 138. Sway stiffeners 137 and 138 generally define the lateral sides of aperture 134.

FIG. 4 shows a second cavity 160 formed in load beam 120. Second cavity 160 has a T-shaped aperture 162 formed into floor 164 of second cavity 160. T-shaped aperture 162 is for receiving a T-shape limiter (not shown) that extends from the suspension flexure. The T-shaped limiter engages floor 164 of cavity 160 to limit travel of the head. Such T-shaped head travel limiters are well known within the relevant art and will not be discussed in detail herein.

In a preferred manufacturing method, load beam 120 and its various features are formed by etching from a single sheet of spring metal such as stainless steel. Thus, in a preferred embodiment, load beam 120, floor 123 of cavity 122, side rails 135 and 136, sway stiffeners 137 and 138, and connection points 139, 140, 141, and 142 all constitute a unitary piece of stainless steel, and all are formed from the same sheet of metal in the same etching step.

One advantage of the design shown is that there are four easily altered design parameters that can be thought of as "tuning knobs" available to the designer for easily adjusting the sway response and other characteristics of the suspension depending on the particular performance parameters desired for any particular application: the geometry and thickness of cavity 122; geometry of the side rails 135 and 136 including the thickness and bends therein; the lengths and positions of trenches 151 and 152; and the geometries of sway stiffeners 137 and 138 including connection points 139, 140, 141, and 142. These easily adjustable parameters give the suspension designer great flexibility in fine tuning the lateral dynamic performance of the load beam during the etching process for any particular application.

Figure 5:
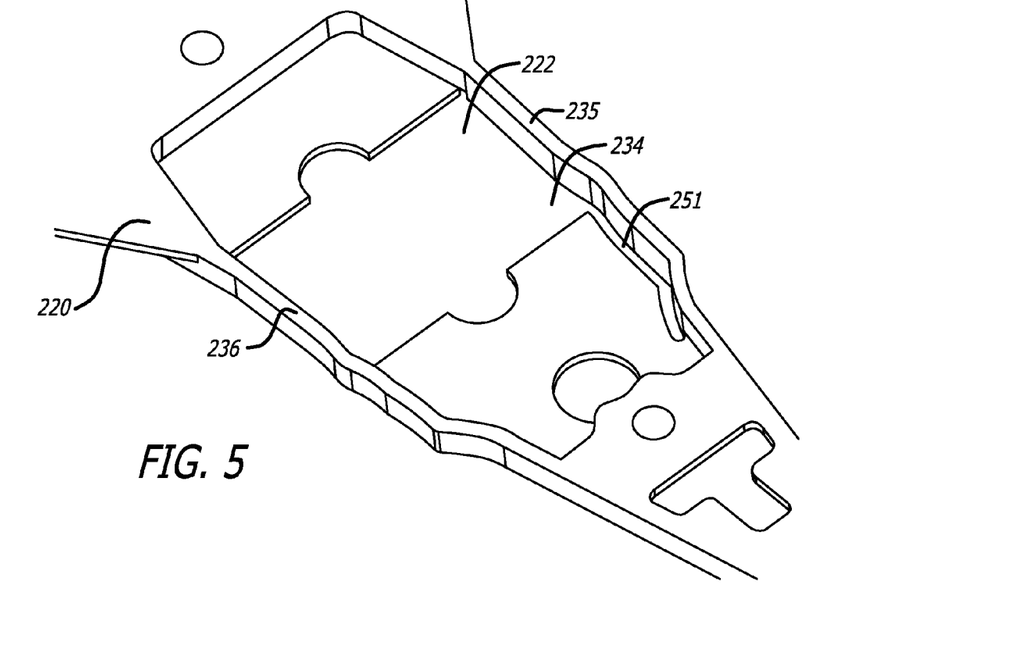
FIG. 5 is an oblique view of the dimple side of a load beam having a cavity for a PZT according to a third embodiment of the invention
Figure 6:
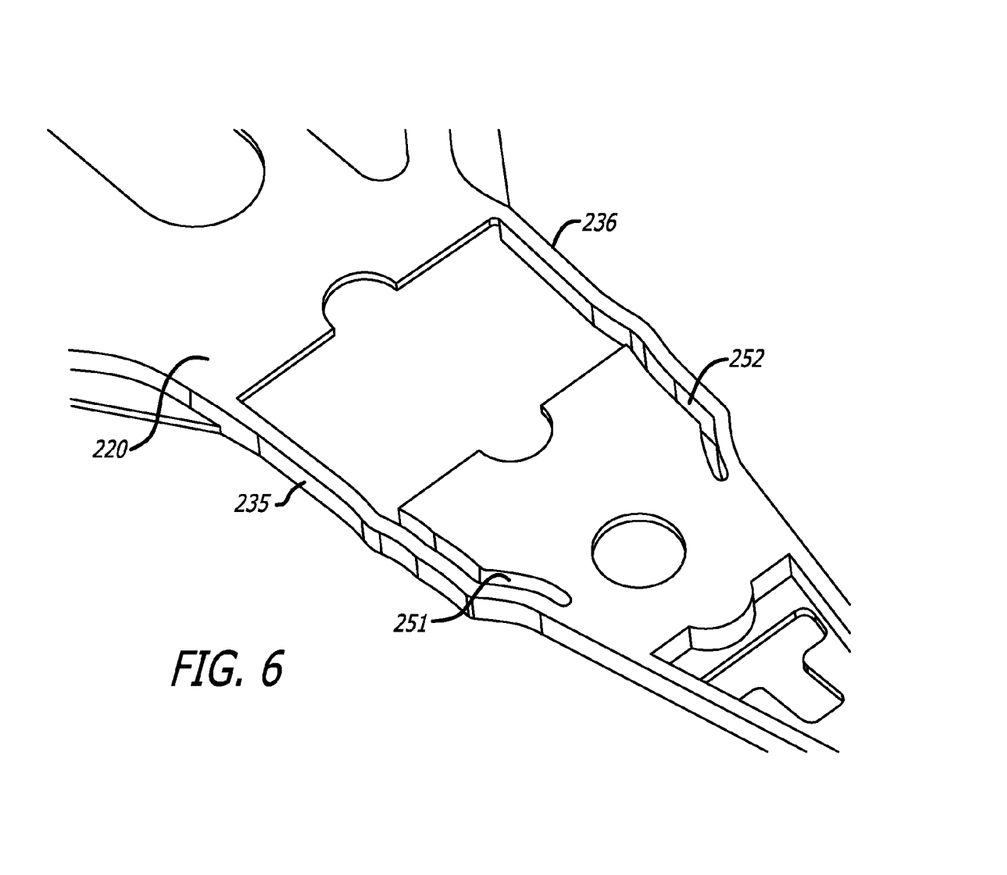
FIG. 6 is an oblique view of the slider side of the load beam of FIG. 5.

FIG. 5 is an oblique view of the dimple side of a load beam having a cavity for a PZT according to a third embodiment of the invention. FIG. 6 is an oblique view of the slider side of the load beam of FIG. 5. In this embodiment there are no sway stiffeners. Rather, aperture 234 extends laterally all the way to side rails 235 and 236. As in the embodiment of FIG. 3, trenches 251 and 252 extend generally longitudinally along side rails 235 and 236, and extend distally beyond the distal most extent of the PZT (not shown) that will be placed into cavity 234 and adhered therein.

In one possible embodiment (not illustrated) the load beam cavity could be very slightly longer than the PZT to allow the PZT to be fitted into the cavity closely enough so that as the PZT expands, it presses directly against the proximal and distal walls of the cavity thereby causing the distal end of the load beam to move.

In another possible embodiment (also not illustrated), there could be a small gap between the proximal and distal ends of the PZT and the proximal and distal walls of the load beam cavity, and a material that hardens such as epoxy injected or allowed to flow into the interstices between the PZT and the cavity's proximal and distal walls. This would reduce the need for precise tolerance between the PZT length and the length of the load beam cavity, but would have the disadvantages of requiring an additional manufacturing step and introducing an additional source of potentially contaminating particles. It is currently contemplated, therefore, that in the preferred embodiment the PZT will be adhered strongly to the floor of the cavity across the aperture in the cavity floor, without requiring that the gap between the ends of the PZT and the cavity walls be tight or filled with a filler material.

The PZT may be electrically interconnected to the source(s) of the driving voltage(s) using any of the traditional microelectronic assembly techniques known to those in the art. However, attachment and bias of one side is typically done using conductive silver epoxy. The epoxy should have a cure temperature below the Curie point of the PZT to prevent de-poling of the device.

The teachings of the present invention can be combined with the teachings of commonly owned U.S. Pat. No. 7,595,965 issued to Kulangara et al. and entitled, "Single PZT Actuator for Effecting Rotation of Head Suspension Loads" (hereafter, "Kulangara '965"), which is hereby incorporated in its entirety by reference, to produce a suspension having a single PZT actuator that is at least partially disposed within a cavity in the load beam, and/or a suspension having a PZT recessed within a cavity in the load beam, with a simple electrical connection from the flexible circuit trace to the PZT actuation voltage electrode such as tape automated bonding (TAB bonding), such as shown in FIGS. 6C and 7B of Kulangara '965 and as described in the accompanying description within that specification.

When the PZT is placed into the cavity such that the top surface of the PZT is generally at the same level as the top surface of the load beam, such that the electrical trace, the microactuator voltage lead, the microactuator voltage surface, and the non-recessed top surface of the load beam are all generally at the same level, the suspension's flexible electrical circuit or a conductive trace extending from the flexible circuit can be routed at least partly over the top surface of the PZT, i.e., the actuation voltage surface, and connected thereto via TAB bonding, a solder bump, or other simplified connection technique, without the need for a time-consuming and exacting tail lead or any other wire from the flexible circuit to the PZT. Possible connection techniques are discussed in both Kulangara '965, which is incorporated herein by reference, and also in commonly owned copending U.S. patent application Ser. No. 11/507,227 which is hereby incorporated as if fully set forth herein.

It is anticipated that DSA suspension design trends will gravitate toward single PZT designs in order to reduce the number of components and minimize costs. It is therefore anticipated that the present invention will be most commonly implemented in single PZT suspension designs; however, the present invention can be used with either single or dual PZT suspension designs.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, it is not necessary that the microactuator motor be a PZT device. Furthermore, the invention is not limited to magnetic hard disk storage media, but is applicable to other types of data storage media including optical disks and their suspensions. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A disk drive suspension having:
   a base portion at a proximal end of the suspension, a load beam movably connected to the base portion by a hinge, a read/write head mounted at an end of the load beam near a distal end of the suspension, and a microactuator for positioning the read/write head;
   wherein the load beam has a recessed cavity formed therein defining a recessed cavity floor, the recessed cavity being disposed distal of the hinge, and the microactuator is at least partially disposed within the cavity and at least partially extends over the recessed cavity floor.

2. The suspension of claim 1 wherein the load beam and the recessed cavity floor constitute a unitary piece of metal.

3. The suspension of claim 2 wherein side rails of the load beam define microactuator hinges, the side rails flexing upon actuation of the microactuator.

4. The suspension of claim 3 wherein the cavity floor has generally longitudinally extending trenches formed therein, the trenches separating respective ones of the side rails from the cavity floor for a distance of at least 50% as long as the microactuator in a space laterally adjacent to the microactuator.

5. The suspension of claim 4 wherein the trenches are longer than is the microactuator motor and the trenches extend past a distal most extent of the microactuator motor.

6. The suspension of claim 2 wherein the cavity floor includes at least one sway stiffener, the sway stiffener extending generally parallel to one of said side rails, the sway stiffener being connected to a remainder of the cavity floor by at least one connection point that is narrower than the sway stiffener.

7. The suspension of claim 6 wherein the sway stiffener is defined on a first side by an aperture in the cavity floor, and on a second side opposite the first side by a trench in the cavity floor that extends generally longitudinally adjacent to and along a respective side rail.

8. The suspension of claim 2 wherein the cavity floor includes a pair of sway stiffeners, the sway stiffeners extending generally parallel to respective side rails of the load beam, each of the sway stiffeners being connected to a remainder of the cavity floor by respective pairs of connection points that are narrower than the sway stiffeners.

9. The suspension of claim 8 wherein the recessed cavity has an aperture therein, the microactuator extends across the aperture, and the sway stiffeners define sides of the aperture.

10. The suspension of claim 8 wherein the load beam, the cavity floor, the side rails, the sway stiffeners, and the connection points are comprised of a unitary piece of metal.

11. A disk drive suspension having:
    a base portion at a proximal end of the suspension, a load beam movably connected to the base portion by a hinge, a read/write head mounted at an end of the load beam near a distal end of the suspension, and a microactuator for positioning the read/write head;
    wherein the load beam has a recessed cavity formed therein, the recessed cavity being disposed distal of the hinge and being at least half as deep as the microactuator is high, and the microactuator is at least partially disposed within the cavity.

12. The suspension of claim 11 wherein the cavity is sufficiently deep such that the microactuator is substantially completely received within the cavity.

13. The suspension of claim 12 wherein the microactuator is thinner than the load beam, and the microactuator has a thickness such that a top of the microactuator lies substantially flush with a top surface of the load beam.

14. The suspension of claim 11 wherein the cavity is less deep than the microactuator motor is high, such that a part of the microactuator motor protrudes from the top of the cavity.

15. The suspension of claim 11 wherein said microactuator motor comprises a split PZT device.

16. A disk drive suspension having:
    a base portion at a proximal end of the suspension, a load beam movably connected to the base portion by a hinge, a read/write head mounted at an end of the load beam near a distal end of the suspension, and a microactuator for positioning the read/write head, wherein:
    the load beam has a recessed cavity formed therein, the recessed cavity being disposed distal of the hinge, the recessed cavity having a cavity floor at a first depth, the recessed cavity further having an aperture formed therein;
    a microactuator is disposed at least partially within the cavity and spanning the aperture, opposite ends of the microactuator being supported on the cavity floor at opposite ends of the aperture; and the load beam further comprises flexible side rails located at least in part laterally of the aperture, the load beam side rails flexing in response to application of an activation voltage to the microactuator to allow the read/write head to move laterally for fine positioning of the head.

17. The suspension of claim 16 wherein the microactuator is grounded directly to the load beam without any wires therebetween.

18. The suspension of claim 16 wherein proximal and distal edges of the cavity are sufficiently close to respective proximal and distal edges of walls of the cavity such that when the microactuator expands, the microactuator pushes directly against the walls of the cavity thereby causing the distal end of the load beam to move.

19. A method of manufacturing a suspension for a hard disk drive comprising:
within the same said etching step, etching a load beam from a sheet of metal, the load beam having a top surface associated therewith, and partially etching a cavity and aperture therein within the top surface of the load beam to form a recessed cavity floor within the load beam for receiving and supporting a microactuator motor within the cavity.

20. The method of claim 19 further comprising:
etching trenches into the cavity, the trenches extending generally longitudinally adjacent side rails of the load beam and at least partly adjacent the aperture;
placing at least one microactuator motor into said cavity, said cavity and said microactuator motor having a footprint associated therewith, wherein the footprint of said cavity is at least as large as the footprint of said microactuator motor, and the cavity is sufficiently deep such that the microactuator motor is substantially completely received within the cavity without protruding beyond the top surface of the load beam;
bonding the microactuator motor to a floor of the cavity via conductive adhesive;
extending a suspension electrical circuit over the microactuator motor at least partly over the microactuator motor and connecting the flexible circuit directly to the microactuator motor without any wire therebetween; and
adjusting via the etching process at least one of the parameters consisting of cavity geometry, cavity thickness, side beam rail thickness, side beam rail bends, lengths of the trenches, and positions of the trenches, for desired sway performance of the suspension.

* * * * *